Dec. 9, 1969 SHIGEYUKI AMAKO ET AL 3,483,411
MINIATURE SYNCHRONOUS MOTOR

Filed April 26, 1967 2 Sheets-Sheet 1

INVENTOR.
Shigeyuki Amako
Shoichi Ohneda
BY

INVENTOR.
Shigeyuki Amako
Shoichi Ohneda
BY

United States Patent Office 3,483,411
Patented Dec. 9, 1969

1

3,483,411
MINIATURE SYNCHRONOUS MOTOR
Shigeyuki Amako, Urawa, and Shoichi Ohneda, Yono, Japan, assignors to Tanak Instrument Company, Limited, Yono, Japan
Filed Apr. 26, 1967, Ser. No. 633,988
Claims priority, application Japan, May 7, 1966, 41/41,703
Int. Cl. H02k 19/02, 21/02
U.S. Cl. 310—162                                    1 Claim

ABSTRACT OF THE DISCLOSURE

In a miniature synchronous motor of fractional horsepower comprising a rotor having a pair of pole plates provided with a plurality of notched subpoles on its periphery between which a permanent magnet is clamped, and a stator having a field coil with a pair of pole plates provided with a plurality of short and long finger-like subpoles extending in the same axial direction, a subrotor in the form of a notched round disc of a single sheet is provided near the rotor in order to effect a smooth operation by eliminating a pulsating motion.

---

This invention relates to synchronous motors, and more particularly, to unidirectional and self-starting fractional horsepower synchronous motors of the reaction type provided with a novel subrotor.

The synchronous motor art has failed to develop a fractional horsepower motor having reliable unidirectional starting characteristics, low starting and running torque, and uniform operating characteristics free from a pulsating motion over a wide range of application and temperature. In the past, there have been proposed many kinds of synchronous motors having a revolving shaft provided with a toothed wheel mechanism. The construction of such motors, however, is so complicated that a high precise fabricating procedure together with a high manufacturing cost is required. In addition, the rotation of such motors is accompanied with an inevitable noise resulting from the revolution of toothed wheels. Moreover, there is a disadvantage that the miniaturization of synchronous motor is limited by the presence of toothed wheels, therefore the field of practical application will be restricted.

In the U.S. patent application entitled, "Self-Starting Synchronous Motor," Ser. No. 513,209, now Patent No. 3,403,273, filed by the inventor, assignor to the same company as that of the present application, a miniature synchronous motor of a substantially similar construction to that of this invention is disclosed, an essential object of which is directed to a unidirectional drive means therefor.

The dimensional construction of miniature synchronous motor described in the above application, Ser. No. 513,-209, now Patent No. 3,403,273, has been met with satisfaction in respect of miniaturization, its essential object, however, it has been observed that its operational characteristic is still to be developed for improvement. For example, it has been found that the above synchronous motor has a trouble in starting, though very rarely, in a state of equilibrium of rotor at the time of operation.

The present invention contemplates to overcome the above defects of small synchronous motors of prior art and provide a superior fractional horsepower synchronous motor having reliable unidirectional starting characteristics, high starting speed, durability, low fabricating cost, and adaptability for mass production.

Briefly stated, in accordance with a preferred embodiment of this invention, the small synchronous motor constructed by the principle of this invention comprises a stator having a field coil with a pair of pole plates on either side, a rotor consisting of an axially magnetized disc permanent magnet having a pair of pole plates on either side, a subrotor of a single sheet of magnetic material having a plurality of notches on its periphery, the subrotor being provided on the rotor, and a unidirectional drive means in the form of a coil spring mounted between stator and rotor.

The synchronous motor of this invention is designed for 120 volt, 50–60 cycle alternating current, and to operate at 200 rotations per minute (r.p.m.) on 50 cycle current or 240 r.p.m. on 60 cycle current with an intended power consumption of about 2 watts: about $\frac{1}{400}$ (one-four hundredth) horsepower, current density 12 milliamperes, and its overall diameter about 27 mm.

The limitations in connection with the above embodiment are not necessarily limitations on the invention of which this embodiment is only illustrative.

In reference to the shaft of the rotor, it is to be noted that a revolving shaft is firmly second to the rotor at the central aperture thereof, which is different from the synchronous motor disclosed in the copending application, Ser. No. 513,209, now Patent No. 3,403,273.

As described hereinbefore, the miniature synchronous motor disclosed in the copending application has had a trouble that it will not start its operation in the state of equilibrium of rotor at its initial time of start. In order to overcome this defect, based on an extensive research, we inventors of this invention have invented a subrotor of a single magnetic sheet freely and concentrically mounted on the revolving shaft of the rotor. The subrotor is made of magnetic material and provided with a plurality of notches on its periphery.

We have discovered that the subrotor is always attracted by the magnetic force of rotor due to its magnetic material, hence it imparts shock to the latter on displacing a little to any direction, whereby the rotor sets in motion in a predetermined direction in an assured and quick way. This pulsating motion of rotor may be an undesirable disadvantage in respect of a smooth operation in view.

In the U.S. patent application described hereinbefore, several embodiments of unidirectional drive means have been disclosed, some improvements relating thereto will be described hereinafter.

It is, therefore, an essential object of this invention to provide a novel subrotor which improves an efficiency of a miniature synchronous motor of relatively simple construction having a fractional horsepower.

It is another object of the invention to provide a novel subrotor of magnetic material adapted for synchronous motors, whereby the pulsating motion of torque will be eliminated without the sacrifice of the operating characteristics in the comparable fractional horsepower synchronous motors of the same specification and dimension now widely in use.

It is still another object of the invention to provide a unidirectional drive means in the form of a coil spring adapted for the small synchronous motor together with the subrotor described above.

Further objects and advantages of the invention will be apparent from the following description, reference being had to the accompanying drawings wherein a preferred embodiment is clearly shown.

Referring to the drawings.

Figure 1:
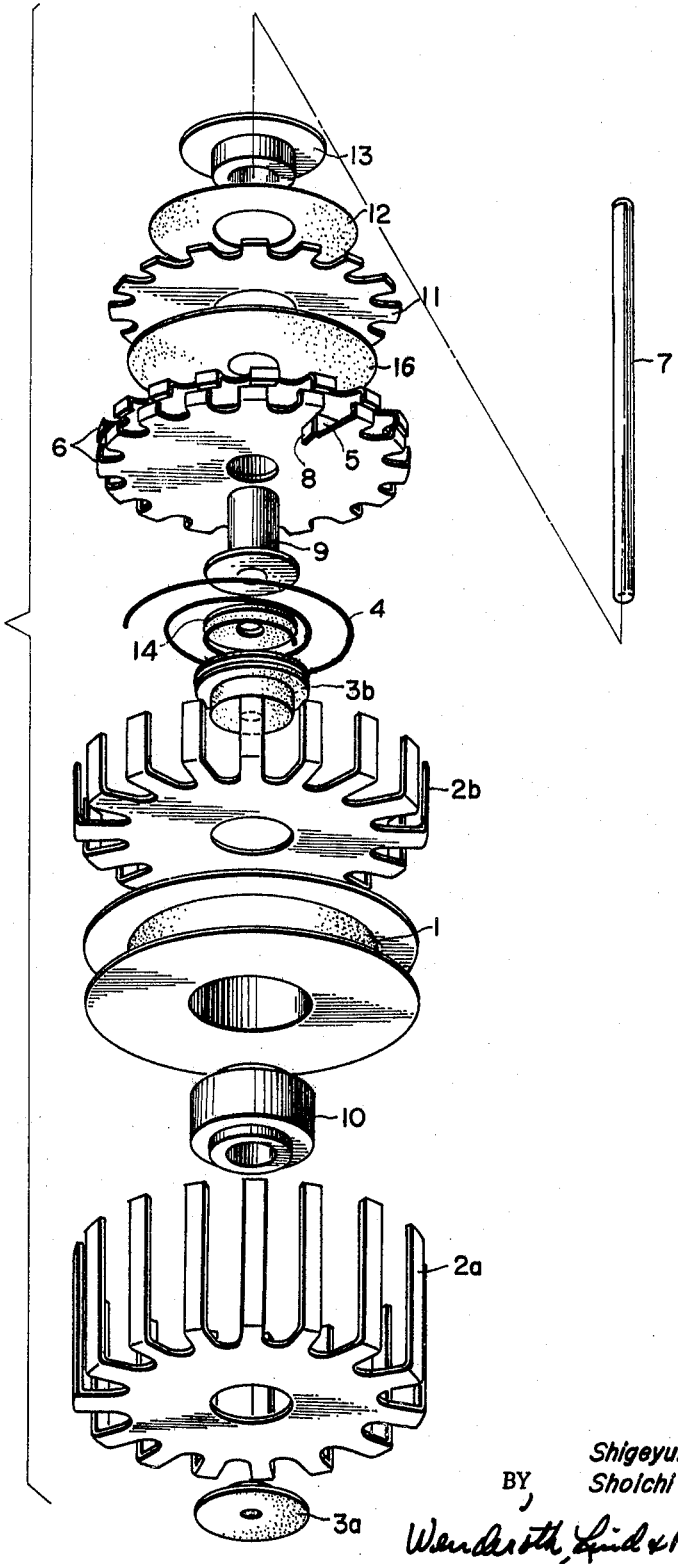
FIGURE 1 is an exploded view in perspective showing the essential components of a synchronous motor of this invention and illustrating the relative positions of the components.
Figure 2:
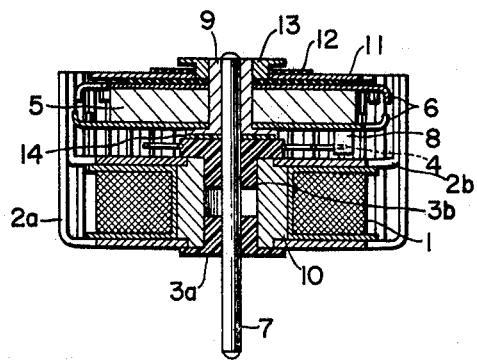
FIG. 2 is a side elevation of the motor of FIG. 1 after assembly.

In FIG. 1 the uppermost member is end bearing metal 13. Immediately below the end bearing metal 13 is washer 12 made of synthetic resin, e.g., Teflon. Immediately below the washer 12 is the subrotor 11 of this invention. The subrotor 11 is of a round magnetic metal sheet having a plurality of notches on its periphery as clearly shown in FIG. 1. The material of subrotor 11 is the same as that of rotor 6. In this embodiment it is made of the same pole plate of rotor from which the portion of subpoles extending from the plane of plate at the periphery thereof is removed by cutting off. The subrotor 11 is freely mounted around a rotatable shaft 7 which secures a rotor 6.

It is to be noted that the diameter of subrotor should be preferably in the range of 85 to 95% that of the rotor 6, and the thickness of subrotor should be in the range of 1–1.5 times that of the rotor. In addition, it has been found that when the number of notches at the periphery of subrotor is equal to that of rotor, its effect is the most advantageous. The material of subrotor 11 should be of a soft magnetic material, such as, cold rolled steel sheet having the thickness of about 0.5 mm. Immediately below the subrotor 11 is washer 16 of the same synthetic resin, Teflon, as that of washer 12. The function of washers 12 and 16 is to provide an appropriate friction as well as magnetic attraction between subrotor and rotor. Therefore, by adjusting the size and thickness or material of two washers referred above, it is seen that the magnetic force can be controlled as desired.

Immediately below the washer 16 is a rotor 6 of synchronous motor of this invention. The rotor 6 is made of an axially magnetized permanent disc magnet 5 having a pair of pole plates of cold rolled steel or the like clamped to opposite sides of the magnet 5 as shown in FIG. 1. Each of the pole plates of rotor is provided with a plurality of subpoles, for example, fifteen subpoles of notched form on the periphery thereof, and the total number of subpoles of two plates amounts to thirty in all. In addition, it is arranged that the ends of a pair of opposed subpoles are in staggered relation in the range of about 1/100 (one-hundredth) to 3/4 (three-fourths) of the width of each end of subpole as shown in FIG. 1, which is one of the features of the rotor of this invention. It has been found that the rotor can rotate with staggered ends of opposed subpoles, but cannot do at all if they are in complete register of each other.

The material of permanent magnet 5 may be barium ferrite, Alnico steel, cobalt steel or the like, and in this embodiment the material of 140 gauss of magnetic induction is used.

The above limitation is illustrative only, not limited.

The diameter of rotor 6 should be smaller than the inside diameter of circle made by the groups of subpoles 2a and 2b so as to be housed in a cylindrical space produced thereby, and rotated freely therein. A shaft 7 is secured to the rotor 6 so that it is rotated together with the latter.

As shown in FIG. 1, a protuberance 8 in the form of a square piece bent outwardly and perpendicularly to the plane of pole plate is formed integrally at the underside of the rotor 6. Immediately below the rotor 6 is bearing metal 9, and below the bearing metal 9 is coil spring 4, an inner end portion of which is fixed into the groove of bearing 3b. An outer end of the coil spring 4 is adapted to slide off or engage with the protuberance 8.

As described above, the inner end of coil spring 4 is secured to the groove of bearing 3b inserted into stator, and the outer end of spring 4 is adapted to slide off or engage with the protuberance 8 provided at the underside of rotor 6.

Figure 5:
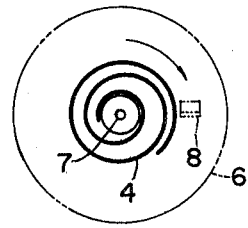
FIG. 5 is a plan view showing the operation of the unidirectional drive means when the rotor is revolved clockwise.
Figure 3:
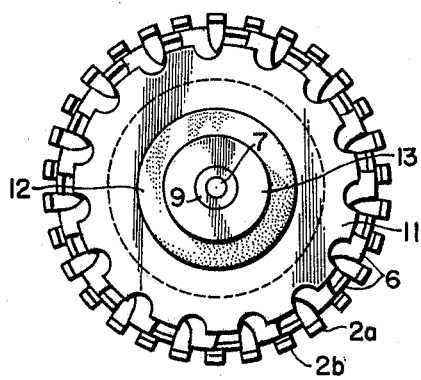
FIG. 3 is a top plan view of FIG. 2 wherein the subrotor of the invention is on the rotor.
Figure 4:
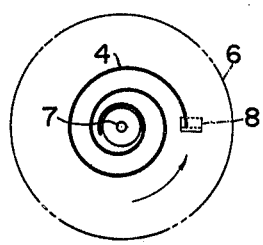
FIG. 4 is a plan view showing the mechanism of a unidirectional drive means in the form of a coil spring wherein an anticlockwise rotation of rotor is prevented thereby.

It is arranged that when the rotor 6 starts to revolve anticlockwise or to the direction of an arrow shown in FIG. 4 on energization of field coil 1 of stator, the end of coil spring 4 engages with the protuberance 8 of rotor 6 so that the coil spring is given a momentary elastic reaction. At this instant, the protuberance 8 sets in reaction to the clockwise direction or of an arrow shown in FIG. 5 to make the rotor 6 revolve clockwise. At this moment, a synergetic action resulting from reaction of coil spring 4 and rotation of rotor 6 produces a relatively strong starting torque. At this event, as soon as the rotor 6 begins to rotate clockwise, the protuberance 8 slides along the side of coil spring 4 so that the rotor 6 revolves freely in a predetermined or clockwise direction without interference with the coil spring 4. On the other hand, when the rotor 6 begins to rotate anticlockwise, the protuberance 8 engages with the end of coil spring 4 to stop it, whereby the coil spring is given an elastic reaction which sets in a clockwise rotation of rotor 6. Thus, a rapid and smooth rotation of rotor 6 starts to prevent it from an anticlockwise rotation thereof.

The above construction of a unidirectional drive means in the form of coil spring which engages with the protuberance provided at the underside of rotor is so simple and durable that the miniaturization of synchronous motor can be attained with no mechanism of toothed wheels, which results in an advantage of mass production.

Figure 6:
FIG. 6 is a side elevation of the coil spring adapted for the unidirectional drive means.

In addition, it is understood that the coil spring 4 can be affixed to the rotor 6 in place of the stator, and it is more effective if it is given an appropriate warp as shown in FIG. 6.

Figure 7:
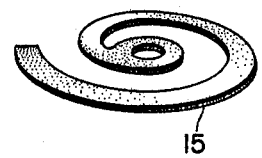
FIG. 7 is a perspective view of a modified unidirectional drive means made of a synthetic resin.

In reference to the diameter of a wire of coil spring, it is preferred to be in the range of 0.3–0.8 mm., and its effective convolution in the range of 1–3 turns. The material of wire of coil spring is selected from the group consisting of non-magnetic stainless steel and Phosphor bronze. Besides, in place of coil spring, a coil form as shown in FIG. 7 punched from a sheet material of 0.1–0.3 mm. in thickness selected from the group consisting of stainless steel, Phosphor bronze, beryllium bronze, synthetic resin and rubber can be employed.

Immediately below the bearing 3b is one of the stator poles in the form of cylinder of magnetically soft material, such as, cold rolled steel or the like. An outer rim of magnetically soft material encircles the periphery of stator pole plate, and a number of subpoles extend from the periphery of pole plate. All of the subpoles are formed out of the material at the periphery thereof when the remainder of material is stamped out so as to leave radially inwardly extending fingers. These fingers are then bent substantially perpendicular to the plane of material as shown. These fingers are preferably formed from the same sheet of material by means of a pressing, punching or drawing operation. One of the finger-like subpoles of pole plate is shown by the numeral 2b.

Immediately below the stator pole 2b is a field coil 1 which is made up of a form of molded plastic having a central aperture. The coil is bobbin-wound on the form, the annular winding comprising, in this particular embodiment, about 7,000–10,000 turns of insulated copper wire of 0.04 mm. in diameter. However, the number of turns of wire is illustrative only, and it is understood that the number of turns of wire depends upon the user's demand.

Immediately below the field coil 1 is a hollow iron core 10. Immediately below the hollow iron core 10 is the other pole plate of stator, one subpole 2a of which is shown. The number of subpoles 2a and its shape are almost similar to those 2b, but the length of subpole 2a is longer than that of subpole 2b as clearly shown in FIG. 1.

The stator consists of two groups of subpoles 2a and 2b having the field coil and the iron core therebetween. On energization of the field coil 1, it is seen that the magnetic force of subpole 2a is weaker than that of subpole 2b, because the former is longer than the latter in length.

When the stator is assembled, it is arranged in such manner that each of short subpoles 2b exists between adjacent long subpoles 2a, and further, the ends of subpoles 2a and 2b make a circumference. In addition, the number of subpoles 2a is the same as that of subpoles 2b, and in this particular embodiment the number of respective subpole is fifteen, that is, the total number of subpoles is thirty in all. In other words, the total number of subpoles of rotor or stator of this synchronous motor is thirty, respectively.

It is known that the speed of synchronous motor is directly proportional to line frequency and inversely proportional to the number of subpoles of stator. Therefore, in this particular embodiment, the number 30 of subpoles of stator is selected in order to utilize the above fact to the full.

N, rotation per minute, of synchronous motors is given by the formula:

$$N = 120f/p$$

In the above formula, $f$ is cycle per second, and $p$ number of poles. In case of 50 cycles ($f=50$), N is 200 because there are 30 poles in this example. 200 r.p.m. is a very low speed for a fractional horsepower synchronous motor of the type described. Accordingly, the synchronous motors having the above low speed are used in a variety of drive systems, such as, turntable, household clocks, timing instruments, stop clocks, elapsed-time indicator, repeat cycle timer, time-delay relay, and printed-circuit binary time encoder, etc.

The number of subpoles of rotor or stator is selected to be thirty, respectively, in this invention, but it is illustrative only and not limited.

The lowermost component of FIG. 1 is bearing 3a.

In reference to the subrotor 11, a novel and essential component of synchronous motor of this invention, we have discovered that the subrotor 11 can reduce a pulsating motion to a minimum. However, it is unknown how it works.

As fully described in the foregoing, the subrotor and unidirectional drive means in accordance with the principle of this invention is characterized in that they are of simple construction, rugged and durable, ideal for the miniaturization of synchronous motor, and they are advantageous that they are easy for the manufacture and particularly adapted for mass production owing to its simple construction so that they can be fabricated at a considerable low cost.

The invention may be carried out in other specific ways than those herein set forth without departing from the spirit and essential characteristics of the invention, and the present embodiment is, therefore, to be considered in all respects as illustrative and not restrictive, and all changes coming within the meaning and equivalency range of the appended claim are intended to be embraced therein.

We claim:
1. In a miniature synchronous motor comprising a rotatable shaft, a stator consisting of a field coil having a pair of pole plates, each of said pole plates being provided with a number of finger-like subpoles extending from said plate and bent substantially perpendicular to the plane of said plate in the axially same direction, said finger-like subpoles of one plate being longer than those of the other plate, said long and short subpoles of said pole plates being arranged in alternate succession, the number of said long subpoles being the same with that of said short subpoles, a rotor attached to said shaft and comprising an axially magnetized permanent disc magnet and a pair of pole plates having a number of subpoles spaced around the periphery thereof clamped to opposite sides of said disc permanent magnet, the number of said subpoles of one plate of said rotor being the same with that of said subpoles of the other plate thereof, the total number of said subpoles of both plates of said stator being the same with that of said subpoles of both plates of said rotor, and a unidirectional drive means provided between said rotor and said stator, the improvement comprising
(a) a subrotor in the form of a single magnetic sheet having a plurality of notches on the periphery thereof and freely mounted about the rotatable shaft of said motor;
(b) the diameter of said subrotor being within the range of from 85–95% of that of said rotor;
(c) the number of notches of the subrotor being equal to the number of those of each of said rotor;
(d) the thickness of said subrotor being within the range of from 1–1.5 times as thick as that of said rotor; and
(e) said subrotor being interposed between a pair of washers made of synthetic resin.

References Cited

UNITED STATES PATENTS

| 2,292,265 | 8/1942 | Carpenter | 310—164 |
| 2,541,830 | 2/1951 | Phaneuf | 310—164 |
| 2,633,950 | 4/1953 | Phaneuf | 310—41 XR |
| 2,766,863 | 10/1956 | Berg | 310—41 XR |

MILTON O. HIRSHFIELD, Primary Examiner

ALFRED G. COLLINS, Assistant Examiner

U.S. Cl. X.R.

310—263, 268